United States Patent
Hougron

(10) Patent No.: US 8,852,481 B2
(45) Date of Patent: Oct. 7, 2014

(54) METHOD OF ENCAPSULATING AN ELECTRICAL ENERGY ACCUMULATION COMPONENT

(75) Inventor: Patrick Hougron, Parcay Meslay (FR)

(73) Assignee: STMicroelectronics (TOURS) SAS, Tours (FR)

( * ) Notice: Subject to any disclaimer, the term of this patent is extended or adjusted under 35 U.S.C. 154(b) by 0 days.

(21) Appl. No.: 13/604,210

(22) Filed: Sep. 5, 2012

(65) Prior Publication Data
US 2013/0071725 A1 Mar. 21, 2013

(30) Foreign Application Priority Data
Sep. 19, 2011 (FR) ...................................... 11 58292

(51) Int. Cl.
*B29C 45/14* (2006.01)
(52) U.S. Cl.
USPC ..................................... 264/272.21; 264/275
(58) Field of Classification Search
None
See application file for complete search history.

(56) References Cited

U.S. PATENT DOCUMENTS

| | | | |
|---|---|---|---|
| 3,420,714 A * | 1/1969 | Knight | 429/133 |
| 3,449,171 A * | 6/1969 | Knight | 264/272.21 |
| 8,033,806 B2 * | 10/2011 | Yoon et al. | 425/89 |
| 2005/0221130 A1 | 10/2005 | Yoon | |
| 2006/0073384 A1 | 4/2006 | Heo et al. | |
| 2007/0154799 A1 * | 7/2007 | Yoon et al. | 429/176 |
| 2008/0261107 A1 | 10/2008 | Snyder et al. | |
| 2010/0209764 A1 * | 8/2010 | Heo et al. | 429/163 |

FOREIGN PATENT DOCUMENTS

| | | | |
|---|---|---|---|
| JP | 2002260609 A | 9/2002 | |
| JP | 2006100064 A | 4/2006 | |

OTHER PUBLICATIONS

Machine English translation of JP 2002-260609.*
INPI Search Report and Written Opinion for FR1158292 mailed Apr. 18, 2012 (8 pages).

* cited by examiner

*Primary Examiner* — Edmund H. Lee
(74) *Attorney, Agent, or Firm* — Gardere Wynne Sewell LLP

(57) ABSTRACT

A method for encapsulating a device, such as an battery, having two opposite and parallel main faces and a peripheral edge, wherein one main face includes an electrical contact zone, includes the steps of retaining the device within an injection chamber of a mold and injecting encapsulation material into the injection chamber to overmold an encapsulation block on the device. The injection chamber is configured to hold a portion of the device, adjacent its peripheral edge, so as to center the device within the injection chamber. The mold includes centering structures that at least partially cover the electrical contact zone. Opposite positioning studs protrude into the injection chamber and bear on the opposite main faces of the device. The resulting packaged device includes an overmolded encapsulation block enveloping the device except for portions covered by the centering structure.

8 Claims, 2 Drawing Sheets

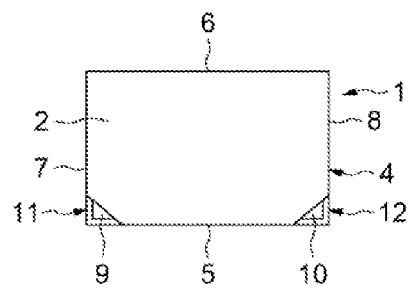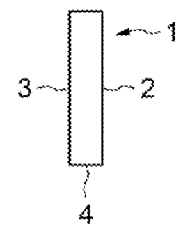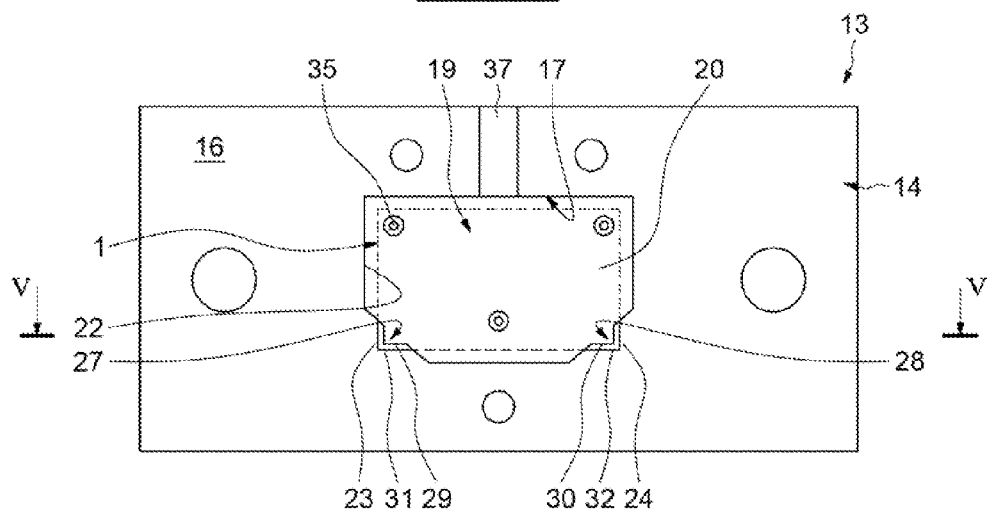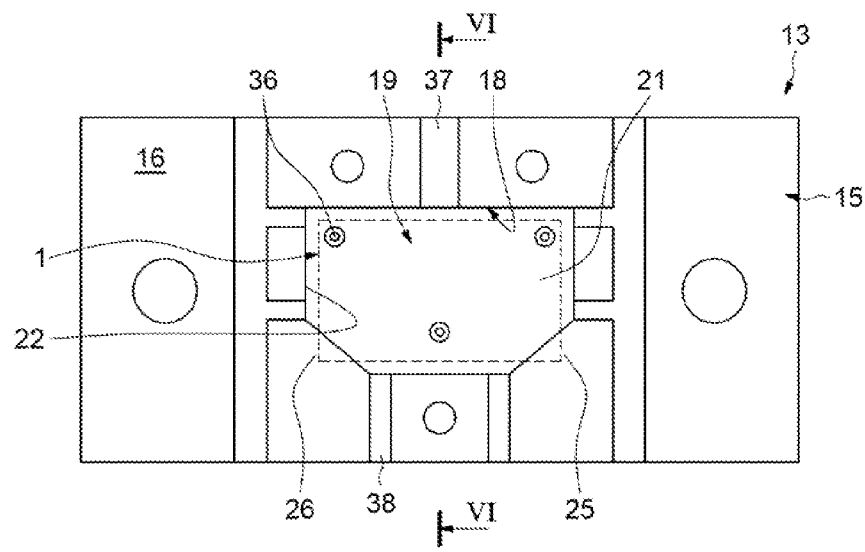

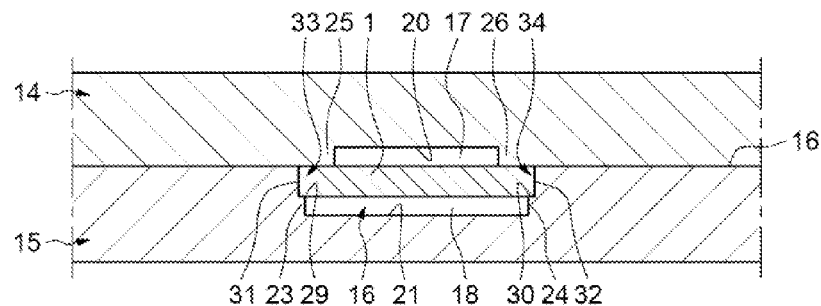
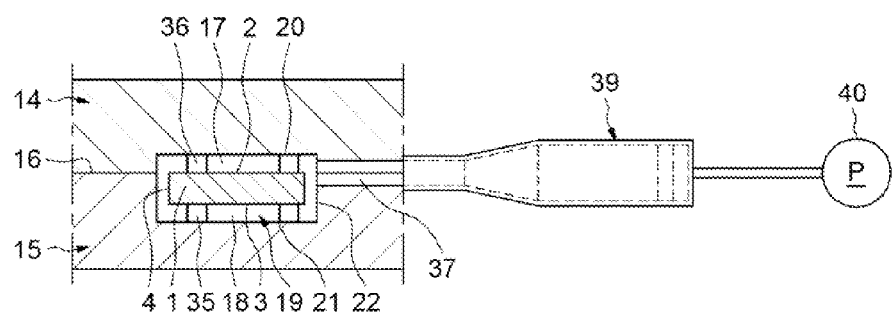
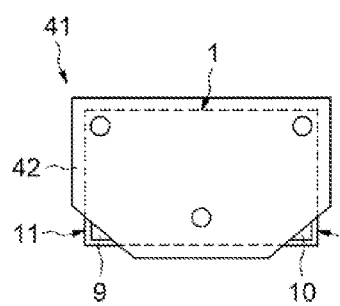
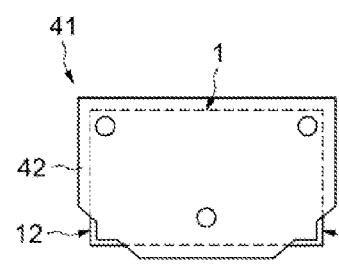
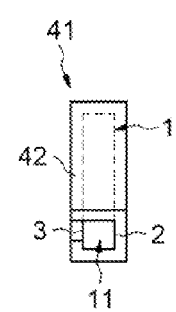

METHOD OF ENCAPSULATING AN ELECTRICAL ENERGY ACCUMULATION COMPONENT

PRIORITY CLAIM

The present application claims priority from French Application for Patent No. 1158292, filed Sep. 19, 2011, the disclosure of which is hereby incorporated by reference.

TECHNICAL FIELD

The present invention relates to the field of batteries and more particularly to the field of micro-batteries.

BACKGROUND

Electrical energy accumulation components are known which have electrical contact zones on one face.

There is a need to protect such energy accumulation components against shocks as well as against external attacks such as humidity, while allowing easy use of the batteries.

SUMMARY

To this end, there is proposed a method of encapsulating an electrical energy accumulation component having two opposite and parallel main faces and a peripheral edge and at least one of whose main faces has at least one electrical contact zone.

This method comprises: placing said accumulation component between two parts of a mold; the accumulation component extending in an injection chamber delimited between these mold parts and being at a distance from the walls of this injection chamber; a portion of the accumulation component, adjacent to its peripheral edge, being held in a centering space formed between said mold parts and at least partially covering said electrical contact zone; said mold parts comprising opposite positioning studs protruding into said chamber and bearing on said opposite main faces of the accumulation component.

Then, the method comprises: injecting an encapsulation material into said chamber, hardening said injected encapsulation material in such a way as to form an encapsulation block, and stripping the battery obtained.

The centering space can be formed between bosses of said mold parts.

At least one of said bosses can have a recess extending said injection chamber and forming a frontal centering shoulder and a lateral centering shoulder.

Said frontal centering shoulder can be right-angled and said lateral centering shoulder can be wedge-shaped.

Two portions of the accumulation component, adjacent to its peripheral edge, can be held in two centering spaces formed between said mold parts and at least partially covering two electrical contact zones of the accumulation component.

Said portions of the accumulation component can be provided in the corners of the latter.

There is also proposed a battery which comprises an electrical energy accumulation component having two opposite and parallel main faces and a peripheral edge and one of whose main faces has two electrical contact zones, placed such that they are adjacent to said peripheral edge or at a slight distance from the latter.

The proposed battery furthermore comprises an overmolded encapsulation block enveloping said accumulation component, with the exception of portions remaining uncovered, adjacent to its peripheral edge, and at least partially including said electrical contact zones.

Said electrical contact zones can be provided adjacent to or at a slight distance from two corners of the accumulation component.

BRIEF DESCRIPTION OF THE DRAWINGS

A method for encapsulating an electrical energy accumulation component and a battery resulting therefrom will now be described by way of non-limiting examples, illustrated by the drawing in which:

FIG. 1 shows a side view of an electrical energy accumulation component;

FIG. 2 shows a side view of this accumulation element;

FIG. 3 shows a front view of a part of an injection mold, seen from its parting surface;

FIG. 4 shows a front view of another part of an injection mold, seen from its parting surface;

FIG. 5 shows a cross section through V-V of FIG. 3 of the closed mold, including an accumulation component;

FIG. 6 shows a cross section through VI-VI of FIG. 4 of the closed mold, including an accumulation component;

FIG. 7 shows a plan view of an obtained battery;

FIG. 8 shows a bottom view of the obtained battery; and

FIG. 9 shows a side view of the obtained battery.

DETAILED DESCRIPTION OF THE DRAWINGS

As shown in FIGS. 1 and 2, an electrical energy accumulation component 1, which is in the form of a rectangular plate, has two opposite main faces 2 and 3 and a peripheral edge 4 formed by two opposite long sides 5 and 6 and two opposite short sides 7 and 8. On its main face 2, the accumulation component 1 has two uncovered metal electrical contact zones 9 and 10 which are arranged at slight distances from two of its corners 11 and 12 situated at the ends of the long side 5 and of its two short sides 7 and 8. These two electrical contact zones 5 and 6 constitute the positive (+) and negative (−) poles of the accumulation component 1.

As shown in FIGS. 3 to 6, an injection mold 13 has two mold parts, including a bottom part 14 and a top part 15, which couple together in a parting surface 16.

The mold parts 14 and 15 exhibit opposite cavities 17 and 18 such as to delimit, between these mold parts 14 and 15, an imprint or injection chamber 19 which has, at the bottom of the cavities 17 and 18, opposite main walls 20 and 21, parallel with the parting surface 16 and which has a peripheral lateral wall 22 which is perpendicular to the parting surface 16.

The injection chamber 19 is substantially of parallelepipedic shape, with the exception of two cut-off corners occupied, on either side of the parting surface 16, by bosses 23, 24 and 25, 26 of the mold parts 14 and 15, such that the peripheral lateral wall 22 of the injection chamber 19 is formed, in cross section through the parting surface 16, by the geometric periphery of a rectangle and a trapezium, the long side of the trapezium being merged with one of the long sides of the rectangle.

The bosses 23 and 24 of the mold part 14 have recesses 27 and 28, open towards the injection chamber 19 and towards the parting surface 16, which form frontal right-angled centering shoulders 29 and 30 situated set back with respect to the parting surface 16 and parallel with the latter, and lateral centering shoulders 31 and 32 in the form of corners perpendicular to the parting surface 16, while the bosses 25 and 26 of the mold part 25 extend up to the parting surface 16.

Thus, as shown particularly in FIG. 5, the opposite bosses 23 and 25 on the one hand and 24 and 26 on the other hand form between them centering and clamping spaces 33 and 34 extending the injection chamber 19, locally at two places in its peripheral wall 22.

Moreover, the mold parts 14 and 15, inside the injection chamber 16, have pluralities of opposite positioning studs 35 and 36, for example three of them, which protrude with respect to the bottoms 20 and 21 of the cavities 17 and 18.

The accumulation component 1 can be installed in the mold 13 as follows.

With the mold part 14 placed such that its cavity 15 is facing upwards, the accumulation component 1 is placed in a position such that the corners 11 and 12 of its peripheral edge 4 are inserted into and bearing on the lateral centering shoulders 31 and 32 of the bosses 23 and 24, that the edges of the main face 3 of the accumulation component 1, adjacent to these corners 11 and 12, bear on the frontal centering shoulders 29 and 30 of the bosses 23 and 24 and that the main face 3 is placed on the positioning studs 35.

Then, the mold part 15 is placed on and coupled with the mold part 14, in a position such that the cavities 17 and 18 are connecting.

In this position, the frontal faces of the bosses 25 and 26, situated in the parting surface 16, bear on the edges of the main face 2 of the accumulation component 1, adjacent to these corners 11 and 12, and the main face 2 of the accumulation component 1 bears on the ends of the positioning studs 36.

It follows that the portions of the accumulation component 1, adjacent to these corners 11 and 12, are held or clamped in the clamping spaces 33 and 34, that the frontal faces of the bosses 25 and 26 at least partially cover the uncovered metal electrical contact zones 9 and 10, that the rest of the accumulation component 1 extends in the injection chamber 19, and that the accumulation component 1 is held between the positioning studs 35 and 36.

Moreover, the injection chamber 19 is sized such that, except for the portions of the accumulation component 1 adjacent to its corners 11 and 12, the main faces 2 and 3 of the accumulation component 1 are at a distance from the bottoms 20 and 21 of the cavities 17 and 18 and that the peripheral edge 4 of the accumulation component 1 is at a distance from the peripheral lateral wall 22 of the injection chamber 19, it being possible for the corresponding distances to be equal.

As shown in FIGS. 3, 4 and 6, the mold parts 14 and 15 have, in the parting surface 16, opposite grooves forming an injection channel 37 and the mold part 15 has, in the parting surface 16, a plurality of grooves forming vents 38.

The injection channel 37 can be connected to an injection syringe 39 whose piston can be actuated by a pressurized air source 40.

When the mold 13 is closed (FIGS. 5 and 6) and contains an accumulation component 1 as previously described, the syringe 39 is coupled with the injection channel 37 and a dose of liquid encapsulation material, for example a heat-hardening resin, is injected into the injection chamber 19.

Then, the mold 13 is heated in order to cause the hardening of the encapsulation material. Finally, the mold 13 is opened.

As shown in FIGS. 7 and 8, a battery 41 is then obtained, comprising an accumulation component 1 around which an encapsulation block 42 is overmolded, with the exception of the portions of the accumulation component 1 adjacent to its corners 11 and 12, such that the metal electrical contact zones 9 and 10 remain at least partly uncovered.

According to a particular example embodiment, the accumulation component 1 can have a thickness of between 0.08 and 0.16 mm, a length of between 25 and 26 mm and a width of between 12 and 13 mm and the encapsulation block 42 can have a thickness of between 0.5 and 0.8 mm, a length of between 26 and 27 mm and a width of between 13 and 14 mm.

The present invention is not limited to the examples described above. In particular, the centering spaces can be arranged partly in one mold part and partly in the other mold part, the mold parts consequently having centering shoulders. Many other variant embodiments are possible without departing from the scope defined by the appended claims.

What is claimed is:

1. A method, comprising:
   placing an electrical energy accumulation component between two parts of a mold, said electrical energy accumulation component having two opposite and parallel main faces, a peripheral edge, a first electrical contact in a first electrical energy accumulation component corner and a second electrical contact in a second electrical energy accumulation component corner, at least one main face having at least one electrical contact zone, said mold comprising an injection chamber delimited between the two parts of the mold, said electrical energy accumulation component extending in the injection chamber at a distance from walls of the injection chamber, wherein a portion of the electrical energy accumulation element, adjacent to the peripheral edge, is held in a centering space formed between said two parts of the mold and at least partially covering said electrical contact zone, said two parts of the mold further comprising opposite positioning studs protruding into said injection chamber and bearing on said main faces of the electrical energy accumulation component;
   injecting an encapsulation material into said injection chamber;
   hardening said injected encapsulation material to form an encapsulation block overmolded on the electrical energy accumulation component except to reveal said first and second electrical contacts; and
   removing the encapsulated electrical energy accumulation component from the mold.

2. The method according to claim 1, wherein said centering space is formed between bosses of said two mold parts.

3. The method according to claim 2, wherein at least one of said bosses has a recess extending said injection chamber and forming a frontal centering shoulder and a lateral centering shoulder.

4. The method according to claim 3, wherein said frontal centering shoulder is right-angled and said lateral centering shoulder is wedge-shaped.

5. The method according to claim 1, wherein two portions of the electrical energy accumulation component, adjacent to the peripheral edge, are held in two centering spaces formed between said two parts of the mold and at least partially covering two electrical contact zones of the accumulation component.

6. The method according to claim 5, wherein said portions of the electrical energy accumulation component are located in corners of the electrical energy accumulation component.

7. A method, comprising
   placing an electrical energy accumulation component between two parts of a mold;
   wherein said electrical energy accumulation component includes top and bottom surfaces and a first device corner and a second device corner;
   wherein said electrical energy accumulation components includes a first electrical contact in the first electrical energy accumulation component corner and a second electrical contact in the second electrical energy accumulation component corner;

wherein said two parts of the mold are configured with a structure that centers the electrical energy accumulation component within an injection cavity defined between the two parts of the mold;

wherein said structure that centers comprises angle structures configured to retain side edges of the electrical energy accumulation component at the first and second electrical energy accumulation component corners and clamping structures configured to clamp against the top and bottom surfaces of the electrical energy accumulation component at the first and second device corners; and injecting an encapsulating material into the injection cavity to form an encapsulating block overmolded on the electrical energy accumulation component except at the side edges of the electrical energy accumulation component retained by the structure that centers so as to reveal said first and second electrical contacts and except at the top and bottom surfaces of the electrical energy accumulation component clamped by the structure that centers.

8. A method, comprising:

placing an electrical energy accumulation component between two parts of a mold;

wherein said electrical energy accumulation component includes top and bottom surfaces and side edges;

wherein said electrical energy accumulation component includes a first electrical contact in a first electrical energy accumulation component corner at one side edge and a second electrical contact in a second electrical energy accumulation component corner at another side edge;

wherein said two parts of the mold are configured with a structure that centers the electrical energy accumulation component within an injection cavity defined between the two parts of the mold;

wherein said structure that centers comprises edge structures configured to retain the side edges of the electrical energy accumulation component and clamping structures configured to clamp against the top and bottom surfaces of the electrical energy accumulation component; and injecting an encapsulating material into the injection cavity to form an encapsulating block overmolded on the electrical energy accumulation component except at the side edges of the electrical energy accumulation component retained by the edge structures so as to reveal said first and second electrical contacts and except at the top and bottom surfaces of the electrical energy accumulation component clamped by the clamping structure.

* * * * *